(12) United States Patent
Shepherd

(10) Patent No.: US 9,976,688 B2
(45) Date of Patent: May 22, 2018

(54) COATING METHOD

(71) Applicant: Advanced Insulation PLC, Gloucester (GB)

(72) Inventor: Simon Harry Shepherd, Gloucester (GB)

(73) Assignee: ADVANCED INSULATION PLC, Gloucester (GB)

( * ) Notice: Subject to any disclaimer, the term of this patent is extended or adjusted under 35 U.S.C. 154(b) by 0 days. days.

(21) Appl. No.: 15/127,104

(22) PCT Filed: Mar. 16, 2015

(86) PCT No.: PCT/GB2015/050758
§ 371 (c)(1),
(2) Date: Sep. 19, 2016

(87) PCT Pub. No.: WO2015/140523
PCT Pub. Date: Sep. 24, 2015

(65) Prior Publication Data
US 2017/0108159 A1  Apr. 20, 2017

(30) Foreign Application Priority Data

Mar. 20, 2014 (GB) .................................. 1404992.8

(51) Int. Cl.
*F16L 59/02* (2006.01)
*B32B 38/10* (2006.01)
(Continued)

(52) U.S. Cl.
CPC .............. *F16L 59/029* (2013.01); *B32B 1/02* (2013.01); *B32B 3/263* (2013.01); *B32B 3/266* (2013.01);
(Continued)

(58) Field of Classification Search
CPC ........ F16L 59/029; B32B 37/12; B32B 38/10; B32B 27/32; B32B 27/40; B32B 5/18;
(Continued)

(56) References Cited

U.S. PATENT DOCUMENTS 2,079,729 A * 5/1937 Balfe ..................... F16J 15/122
277/348
4,673,102 A   6/1987 Bullock, Jr.
(Continued)

FOREIGN PATENT DOCUMENTS

GB   2172547 A * 9/1986 ............ F16L 59/027
GB   2253896 A   9/1992
(Continued)

OTHER PUBLICATIONS

International Search Report and Written Opinion issued in PCT/GB2015/050758, dated Jun. 16, 2015, 12 pages.

*Primary Examiner* — Philip Tucker
*Assistant Examiner* — Vicki Wu
(74) *Attorney, Agent, or Firm* — Pearne & Gordon LLP

(57) ABSTRACT

A method of coating an expandable item (10) such as a pressure vessel or process vessel used for instance in the off shore oil industry. A compressible flexible intermediate layer (14) is provided on the item (10), and a support member (18) is embedded in the intermediate layer (14). The support member (18) comprises an open framework base (20) and a plurality of projecting members upstanding therefrom and extending out of the intermediate layer (14) away from the item (10). A thermally insulating coating layer (12) is applied over the intermediate layer (14) such that the projecting members (22) extend into the coating layer (12), and are wholly located in the coating layer (12).

19 Claims, 2 Drawing Sheets

Figure 1:
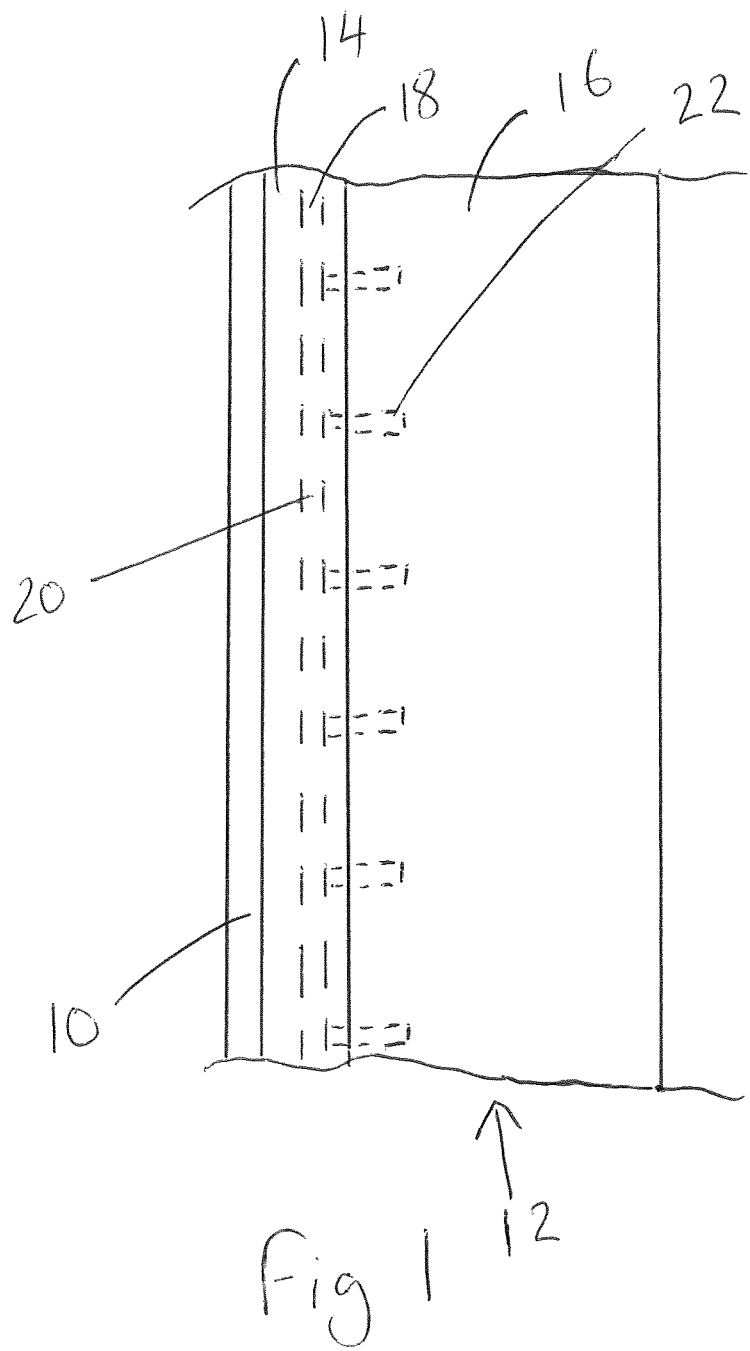

(51) Int. Cl.

| | |
|---|---|
| *B32B 27/32* | (2006.01) |
| *B32B 27/40* | (2006.01) |
| *B32B 5/18* | (2006.01) |
| *B32B 27/28* | (2006.01) |
| *B32B 27/34* | (2006.01) |
| *B32B 15/18* | (2006.01) |
| *B32B 1/02* | (2006.01) |
| *B32B 7/12* | (2006.01) |
| *B32B 3/26* | (2006.01) |
| *B32B 15/04* | (2006.01) |
| *B32B 15/08* | (2006.01) |
| *B32B 15/095* | (2006.01) |
| *B32B 15/085* | (2006.01) |
| *B32B 27/06* | (2006.01) |
| *B32B 27/08* | (2006.01) |
| *B32B 37/18* | (2006.01) |
| *B32B 37/12* | (2006.01) |

(52) U.S. Cl.
CPC ............ *B32B 5/18* (2013.01); *B32B 7/12* (2013.01); *B32B 15/046* (2013.01); *B32B 15/08* (2013.01); *B32B 15/085* (2013.01); *B32B 15/095* (2013.01); *B32B 15/18* (2013.01); *B32B 27/065* (2013.01); *B32B 27/08* (2013.01); *B32B 27/285* (2013.01); *B32B 27/32* (2013.01); *B32B 27/34* (2013.01); *B32B 27/40* (2013.01); *B32B 37/12* (2013.01); *B32B 37/182* (2013.01); *B32B 38/10* (2013.01); *B32B 2250/02* (2013.01); *B32B 2250/24* (2013.01); *B32B 2255/06* (2013.01); *B32B 2255/10* (2013.01); *B32B 2255/102* (2013.01); *B32B 2255/26* (2013.01); *B32B 2266/0214* (2013.01); *B32B 2307/304* (2013.01); *B32B 2307/3065* (2013.01); *B32B 2307/734* (2013.01); *B32B 2311/00* (2013.01); *B32B 2311/30* (2013.01); *B32B 2323/04* (2013.01); *B32B 2371/00* (2013.01); *B32B 2375/00* (2013.01); *B32B 2377/00* (2013.01); *B32B 2383/00* (2013.01); *B32B 2439/40* (2013.01)

(58) Field of Classification Search
CPC ....... B32B 27/285; B32B 27/34; B32B 15/18; B32B 1/02; B32B 7/12; B32B 3/263; B32B 3/266; B32B 15/046; B32B 15/08; B32B 15/095; B32B 15/085; B32B 27/065; B32B 27/08; B32B 37/182; B32B 2307/3065; B32B 2307/304; B32B 2439/40; B32B 2307/734; B32B 2323/04; B32B 2375/00; B32B 2383/00; B32B 2311/00; B32B 2311/30; B32B 2371/00; B32B 2377/00; B32B 2250/24; B32B 2250/02; B32B 2255/06; B32B 2255/26; B32B 2255/10; B32B 2255/102; B32B 2266/0214
USPC ........................................................ 156/242
See application file for complete search history.

(56) References Cited

U.S. PATENT DOCUMENTS

| 4,835,975 A | 6/1989 | Windecker |
| 2003/0155656 A1* | 8/2003 | Chiu ................. H01L 23/49827 257/774 |

FOREIGN PATENT DOCUMENTS

| JP | S55121035 A | 9/1980 |
| SU | 1272360 A1 | 11/1986 |

* cited by examiner

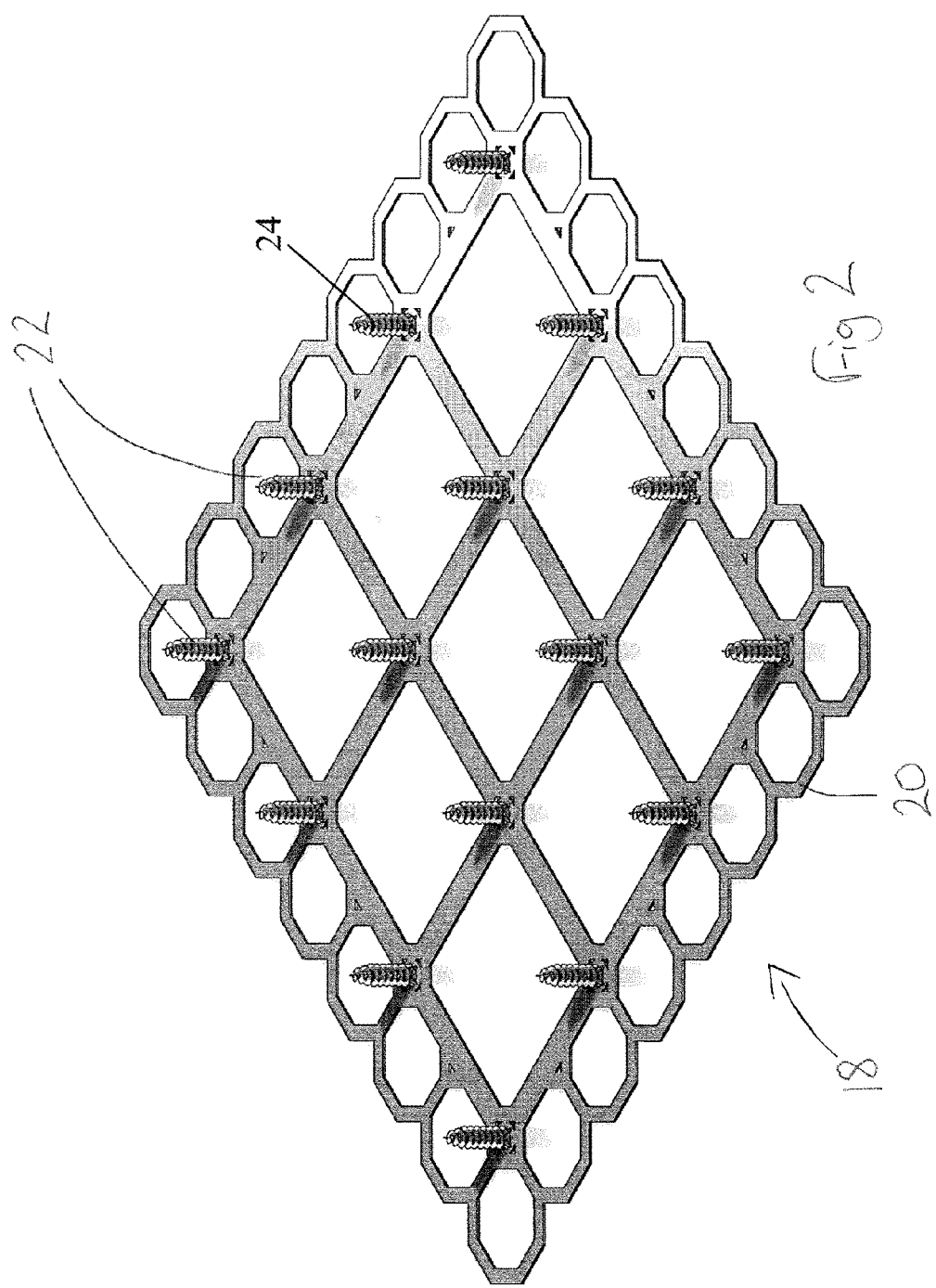

COATING METHOD

This invention concerns a method of coating an expandable item, and typically for example coating a pressure or process vessel which may thermally expand and contract during use.

Pressure or process vessels which may typically be made of steel but can be made of other materials, can expand and contract quite significantly during use as a result of changing temperatures within. It is often desired or required to provide an insulating and/or fireproof coating on such vessels. As such coatings will not expand to anything like the same degree as the vessels during heating up and cooling down, it is generally necessary to provide an intermediate layer between the vessel and coating. Difficulties however can be encountered in adhering such layers together, and particularly the materials, used often have low surface energy and therefore do not readily adhere together.

According to the present invention there is provided a method of coating an expandable item, the method including forming a flexible intermediate layer, the intermediate layer including a support member located within a layer of a compressible flexible material, with a plurality of projecting members provided on the support member which extend out of the layer of compressible flexible material on one side thereof, mounting the flexible intermediate layer on the item, with the other side of the layer of compressible flexible material against the item and the projecting members projecting away from the item, and forming a coating layer on the one side of the flexible intermediate layer, with the projecting members extending into the coating layer, and the coating layer extending beyond the projecting members such that distal ends of the projecting members are wholly located in the coating layer.

The support member may include a base which may be in the form of an open framework, and may be generally planar. The base may be located in the layer of compressible flexible material, and may be located at least generally midway between the one side and other side of the layer of compressible flexible material.

The support member base may be made of a flexible material. The support member base may be made of a plastics material and may be made of PEEK or nylon. Alternatively the support member base may be made of metal and may be made of stainless steel.

In one arrangement the support member base and projecting members are integrally formed.

In a further arrangement the projecting members may be mounted on the support member base.

The projecting members may have formations thereon to enhance engagement with the coating layer. The formations may include any of a helical thread, ribs, barbs or other formations.

The support members may be formed in sections which can be connected together with adjacent such sections.

The compressible flexible material may comprise a foamed material which may be any of a polyethylene, polyurethane or silicone foam. The foamed material may be syntactic.

The compressible flexible material may be non-flammable.

The layer of compressible flexible material may be between 3 and 10 mm thick.

The flexible intermediate layer may be formed by moulding the compressible flexible material around the support member.

An adhesive may be provided on the other side of the flexible intermediate layer, and the adhesive may be pressure actuable, and may be provided with a backing sheet prior to mounting on the item.

The coating layer may be thermally insulating and/or non-flammable.

The coating layer may be applied wet onto the flexible intermediate layer, and allowed to cure in situ.

The coating layer may be a foamed material and may be of any phenolic, epoxy or polyurethane. The foamed material may be syntactic.

The coating layer may be between 10 and 100 mm thick.

The vessel may be made of metal or composite material. The vessel may be a pressure or process vessel.

The invention further provides an item coated with a method according to any of the preceding seventeen paragraphs.

An embodiment of the present invention will now be described by way of example only and with reference to the accompanying drawings, in which:

FIG. 1 is a diagrammatic cross sectional view through part of an item coated by a method according to the present invention; and FIG. 2 is a perspective view of part of the coating shown in FIG. 1.

FIG. 1 shows part of an item 10 with a coating 12 applied thereto. The item 10 may be a pressure vessel or process vessel used for instance in the offshore oil industry. In use this vessel may experience a significant range of working temperatures, for instance between −196° and 250°. Such heating and cooling can cause the vessel 10 to expand or contract for instance by up to 1 mm.

The coating 12 comprises an intermediate layer 14 and a coating layer 16. The intermediate layer 14 comprises a layer of a compressible flexible material such as syntactic silicone foam, including compressible micro spheres, and may be 4 mm thick.

A support member 18 is embedded in the intermediate layer 14. The support member is best shown in FIG. 2, and comprises a base 20 in the form of an open framework, and portions of the base 20 can be interconnected to adjacent such portions. A plurality of projecting members 22 are upstanding as shown in FIG. 1 from the base 20, and extend out of one side of the intermediate layer 14. The projecting members 22 have a formation thereon to engage with the coating layer 16. In this instance the formation is a helical thread 24.

The coating layer is for instance around 16 mm thick and may be made of a thermally insulating material which may also be non-flammable. In this instance the coating layer 16 is a syntactic phenolic foam.

In use the item 10 can be coated as follows. Firstly the intermediate layer 14 is formed. This is formed by moulding the compressible flexible layer around the support member 18, such that the base 20 of the support member 18 is generally in the middle of the intermediate layer 14, with the projecting members 12 extending outwardly therefrom on one side.

A pressure sensitive adhesive may be applied on the side of the intermediate layer 14 through which the projecting members 22 do not extend, and this can be provided with a backing paper. The intermediate layer 14 can be mounted on the item 10 using the adhesive following removal of the backing paper, and sheets of the intermediate layer 14 can be cut to size and shape as required.

The coating layer 16 can then be applied wet onto the outside of the intermediate layer 14. The projecting members 22 help to bond the intermediate and coating layers 14, 16 together, which otherwise would not form a strong bond therebetween.

In use as the item 10 expands or contracts due to different temperatures, the intermediate layer 14 can be compressed between the item 10 and coating layer 16, or in some instances extended, thereby absorbing the different rates of thermal expansion between the item 10 and the coating layer 16, which layer 16 would generally have a relatively low coefficient of thermal expansion.

There is thus described a method of coating an expandable item with for instance insulating and/or non-flammable material which provides for an advantageous arrangement, and particularly readily permits the intermediate and coating layers to be interconnected to provide a strong bond therebetween which otherwise can be difficult to achieve. As the coating layer is applied wet, this can be applied around different shapes, and in situations where access may be limited.

Various modifications may be made without departing from the scope of the invention. For instance, the support member may take a different form, and the base and projector members may be integrally formed, or can be separate components mounted together. Different formations may be provided on the projecting members such as ribs or barbs. The coating layer may be made of different material and could for instance be an epoxy or polyurethane based foam.

The method could be used to coat different items, and these items could be made of a composite material rather than metal. Different materials may be used in the intermediate layer and these could comprise non syntactic foams, polyethylene or polyurethane foams.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of coating an expandable item, the method including forming a flexible intermediate layer, the intermediate layer including a support member located within a layer of a compressible flexible material, with a plurality of projecting members provided on the support member which extend out of the layer of compressible flexible material on one side thereof, mounting the flexible intermediate layer on the item, with the other side of the layer of compressible flexible material against the item and the projecting members projecting away from the item, and forming a coating layer on the one side of the flexible intermediate layer, with the projecting members extending into the coating layer, and the coating layer extending beyond the projecting members such that distal ends of the projecting members are wholly located in the coating layer.

2. A method according to claim 1, in which the support member includes a base.

3. A method according to claim 2, in which the base is in the form of an open framework.

4. A method according to claim 2, in which the base is generally planar.

5. A method according to claim 2, in which the base is located in the layer of compressible flexible material.

6. A method according to claim 5, in which the base is located at least generally midway between the one side and other side of the layer of compressible flexible material.

7. A method according to claim 2, in which the support member base is made of any of a flexible material, plastics material, PEEK or nylon, metal, stainless steel.

8. A method according to claim 2, in which either the support member base and projecting members are integrally formed, or the projecting members are mounted on the support member base.

9. A method according to claim 1, in which the projecting members have formations thereon to enhance engagement with the coating layer, the formations including any of a helical thread, ribs or barbs.

10. A method according to claim 1, in which the support members are formed in sections which can be connected together with adjacent such sections.

11. A method according to claim 1, in which the compressible flexible material comprises any of a foamed material, polyethylene, polyurethane, silicone foam, a syntactic material, a non-flammable material.

12. A method according to claim 1, in which the layer of compressible flexible material is between 3 and 10 mm thick, and/or the coating layer is between 10 and 100 mm thick.

13. A method according to claim 1, in which the flexible intermediate layer is formed by moulding the compressible flexible material around the support member.

14. A method according to claim 1, in which an adhesive is provided on the other side of the flexible intermediate layer, the adhesive is pressure actuable, and the adhesive is provided with a backing sheet prior to mounting on the item.

15. A method according to claim 1, in which the coating layer is thermally insulating, and non-flammable.

16. A method according to claim 1, in which the coating layer is applied wet onto the flexible intermediate layer, and allowed to cure in situ.

17. A method according to claim 1, in which the coating layer is a foamed material, selected from the group consisting of: phenolic, epoxy, polyurethane, and syntactic.

18. A method according to claim 1, in which the expandable item is made of metal or composite material.

19. A method according to claim 1, in which the expandable item is a pressure or process expandable item.

\* \* \* \* \*